US012039533B2

(12) United States Patent
Higgins

(10) Patent No.: US 12,039,533 B2
(45) Date of Patent: Jul. 16, 2024

(54) METHOD AND SYSTEM FOR NET SETTLEMENT BY USE OF CRYPTOGRAPHIC PROMISSORY NOTES ISSUED ON A BLOCKCHAIN

(71) Applicant: MasterCard International Incorporated, Purchase, NY (US)

(72) Inventor: Stephen Higgins, Cork (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1618 days.

(21) Appl. No.: 15/342,463

(22) Filed: Nov. 3, 2016

(65) Prior Publication Data

US 2018/0121918 A1    May 3, 2018

(51) Int. Cl.
*G06Q 20/40* (2012.01)
*G06Q 20/02* (2012.01)
(Continued)

(52) U.S. Cl.
CPC ........... *G06Q 20/401* (2013.01); *G06Q 20/02* (2013.01); *G06Q 20/065* (2013.01); *H04L 63/0435* (2013.01)

(58) Field of Classification Search
CPC .... G06Q 20/401; G06Q 20/02; G06Q 20/065; H04L 63/0435
(Continued)

(56) References Cited

U.S. PATENT DOCUMENTS 5,850,444 A * 12/1998 Rune .................... G06Q 20/027
705/79
9,397,985 B1    7/2016 Seger, II et al.
(Continued)

FOREIGN PATENT DOCUMENTS

| CN | 105809420 A | 7/2016 |
| CN | 105976232 A | 9/2016 |
| WO | 2016008659 A1 | 1/2016 |

OTHER PUBLICATIONS

Watanabe et al., "Blockchain Contract: A Complete Consensus using Blockchain," 2015 IEEE 4th Global Conference on Consumer Electronics (GCCE), Oct. 27, 2015, pp. 577-578, IEEE.
(Continued)

*Primary Examiner* — Patrick McAtee
*Assistant Examiner* — Zesheng Xiao
(74) *Attorney, Agent, or Firm* — Panitch Schwarze Belisario & Nadel LLP

(57) ABSTRACT

A method for generating a cryptographic promissory note for posting to a blockchain includes: receiving an authorization request for a payment transaction, the authorization request being a transaction message formatted based on one or more standards that includes a plurality of data elements including a first data element configured to store a blockchain address and a second data element configured to store a transaction amount; generating a promissory note including the transaction amount; digitally signing the generated promissory note with a private key; encrypting the signed promissory note with a symmetric key; wrapping the symmetric key with a public key corresponding to the private key and a public key associated with an acquirer involved in the payment transaction; and electronically transmitting a blockchain transaction to a blockchain network that includes the encrypted promissory note, each symmetric key, and the blockchain address.

26 Claims, 8 Drawing Sheets

(51) Int. Cl.
*G06Q 20/06* (2012.01)
*H04L 9/40* (2022.01)

(58) Field of Classification Search
USPC .......................................................... 705/75
See application file for complete search history.

(56) References Cited

U.S. PATENT DOCUMENTS

| | | | | |
|---|---|---|---|---|
| 2004/0083286 | A1* | 4/2004 | Holden | G06F 21/31 709/225 |
| 2006/0210082 | A1* | 9/2006 | Devadas | G06F 21/31 380/277 |
| 2014/0207682 | A1* | 7/2014 | Wolfond | G06Q 20/3276 705/44 |
| 2016/0203448 | A1 | 7/2016 | Metnick et al. | |
| 2016/0253663 | A1 | 9/2016 | Clark et al. | |
| 2016/0342976 | A1* | 11/2016 | Davis | G06Q 20/065 |
| 2017/0011365 | A1* | 1/2017 | Fransson | G06Q 20/3821 |
| 2017/0048235 | A1* | 2/2017 | Lohe | G06Q 20/065 |
| 2017/0324711 | A1* | 11/2017 | Feeney | H04L 9/3247 |
| 2019/0087893 | A1* | 3/2019 | Pellew | G06Q 20/3825 |

OTHER PUBLICATIONS

Swan, Blockchain: Blueprint for a New Economy, Feb. 8, 2015, pp. 1-149, O'reilly Media, Inc., United States of America.
Notification of Transmittal of the International Search Report and the Written Opinion of the International Searching Authority (Forms PCT/ISA/220, PCT/ISA/220 and PCT/ISA/237) issued on Dec. 20, 2017, by the European Patent Office in corresponding International Application No. PCT/US2017/056008. (15 pages).
Office Action (Examination Report) issued on Aug. 26, 2020, by the Intellectual Property India in corresponding India Patent Application No. 201817006802 with an English Translation of the Office Action. (8 pages).
Yaga et al. "NISTIR 8202 Blockchain Technology Overview" Oct. 2018, Nist U.S. Department of Commerce. https://doi.org/10.6028/NIST.IR.8202.
Anonymous: "Pretty Good Privacy—Wikipedia", May 30, 2014 (May 30, 2014), XP055680011, Retrieved from the Internet: URL:https://en.wikipedia.org/w/index.php? title=Pretty_ Good_ Privacy&oldid=610830737 [retrieved on Mar. 26, 2020], (15 pages).
Office Action (Communication pursuant to Article 94(3) EPC) issued on Jul. 3, 2020, by the European Patent Office in corresponding European Patent Application No. 17 791 793.7-1213. (10 pages).
Anonymous: "Key encapsulation—Wikipedia, the free encyclopedia", May 22, 2015 (May 22, 2015), XP055817374, Retrieved from the Internet : URL:https: //web.archive.org/web/2015052212 0413/ https ://en.wikipedia . org/wiki/Key_encapsulation [retrieved on Jun. 23, 2021] (2 pages).
Anonymous : "Key wrap—Wikipedia", Oct. 24, 2016 (Oct. 24, 2016), XP055977137, Retrieved from the Internet : URL:https://en.wikipedia . org/w/index .php?title=Key_wrap&oldid=745981622 [retrieved on Nov. 2, 2022] (2 pages).
European Search Report issued Nov. 10, 2022, by the European Patent Office in corresponding European Patent Application No. 22192369.1 (14 pages).
Notification of the First Office Action (PCT Application in National Phase) issued by the China National Intellectual Property Administration on Nov. 2, 2022 in Application No. 201780061694.1, 18 pps.
Notification of the Second Office Action, issued by the China National Intellectual Property Administration on May 13, 2023, in Application No. 201780061694.1, 13 pps.
Rejection Decision, dated Jul. 28, 2023, issued in corresponding Chinese Patent Application No. 201780061694.1, and English-language translation, 14 pgs.
Hearing Notice, dated Nov. 21, 2023, issued in corresponding Indian Application 201817006802, 4 pgs.

* cited by examiner

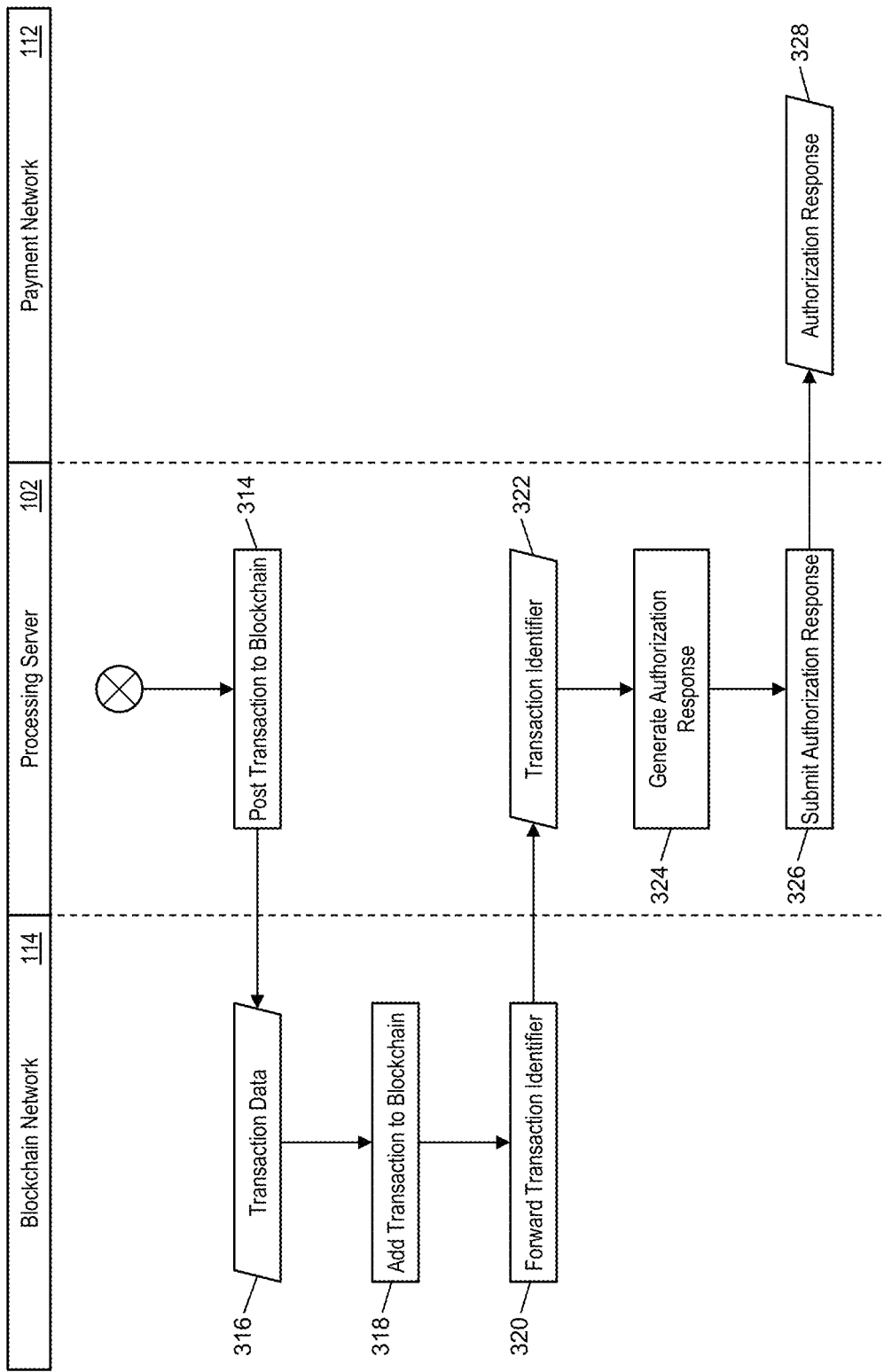

METHOD AND SYSTEM FOR NET SETTLEMENT BY USE OF CRYPTOGRAPHIC PROMISSORY NOTES ISSUED ON A BLOCKCHAIN

FIELD

The present disclosure relates to the generation of cryptographic promissory notes for posting to a blockchain, specifically the generation of cryptographic promissory notes from payment transactions that are posted to a blockchain for use in net settlement of the payment transactions.

BACKGROUND

The settlement of payment transactions is traditionally a highly-centralized process, being performed via the use of a payment network that is also processing a vast number of payment transactions, often in the billions, in the same time frame, where each of those payment transactions will also need to be settled. As a result, there can sometimes be bottlenecks in the settlement process, resulting in less responsive settlements that are not performed as quickly. Such cases may be detrimental to merchants and acquiring institutions, which may have a desire to have their transactions settled more promptly.

In addition, the centralized settlement process is often such that the merchants and other entities are not aware of the value of the settlement that is being performed, due to time-sensitive variables whose value is difficult to predict (e.g., foreign exchange rates). As a result, merchants, acquiring institutions, and other entities are often unable to reliably know the amount of money they are to receive via the settlement. In addition, consumers, investors, and other interested parties are also unable to be made aware of the financial situation of merchants, acquiring institutions, and other entities via the settlement process due to the lack of transparency provided by traditional, highly centralized settlement.

Thus, there is a need for a technical solution to provide transparency in the net settlement process that can provide merchants and/or acquiring institutions with an accurate accounting of their settlement, as well as a guarantee as to the amounts involved. Current settlement processes involve payment network systems that are highly centralized and difficult to modify, thus requiring a solution that utilizes an alternative type of computing system.

SUMMARY

The present disclosure provides a description of systems and methods for generating a cryptographic promissory note for posting to a blockchain. The use of a blockchain may provide for decentralized processing related to settlements, which may increase the speed and volume of processing for transaction settlement. In addition, the transparency that is provided by use of a blockchain, being a decentralized and immutable ledger, may enable merchants, acquirers, and other entities to monitor settlement at all times and independently verify the accuracy of the cryptographic promissory notes associated therewith.

A method for generating a cryptographic promissory note for posting to a blockchain includes: receiving, by a receiving device of a processing server, an authorization request for a payment transaction, wherein the authorization request is a transaction message formatted based on one or more standards and includes at least a plurality of data elements including at least a first data element configured to store a blockchain address and a second data element configured to store a transaction amount; generating, by a generation module of the processing server, a promissory note, wherein the promissory note includes at least the transaction amount; digitally signing, by a signing module of the processing server, the generated promissory note with a private key; encrypting, by an encryption module of the processing server, the signed promissory note with a symmetric key; wrapping, by the encryption module of the processing server, the symmetric key with at least: a public key corresponding to the private key and a public key associated with an acquirer involved in the payment transaction; and electronically transmitting, by a transmitting device of the processing server, a blockchain transaction to a blockchain network, wherein the blockchain transaction includes at least the encrypted promissory note, each wrapped symmetric key, and the blockchain address.

A system for generating a cryptographic promissory note for posting to a blockchain includes: a receiving device of a processing server configured to receive an authorization request for a payment transaction, wherein the authorization request is a transaction message formatted based on one or more standards and includes at least a plurality of data elements including at least a first data element configured to store a blockchain address and a second data element configured to store a transaction amount; a generation module of the processing server configured to generate a promissory note, wherein the promissory note includes at least the transaction amount; a signing module of the processing server configured to digitally sign the generated promissory note with a private key; an encryption module of the processing server configured to encrypt the signed promissory note with a symmetric key, and wrap the symmetric key with at least: a public key corresponding to the private key and a public key associated with an acquirer involved in the payment transaction; and a transmitting device of the processing server configured to electronically transmit a blockchain transaction to a blockchain network, wherein the blockchain transaction includes at least the encrypted promissory note, each wrapped symmetric key, and the blockchain address.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIGS. 3A and 3B are a flow diagram illustrating a process for the generation of a cryptographic promissory note for use in settlement of a payment transaction using the system of FIG. 1 in accordance with exemplary embodiments.

Figure 1:
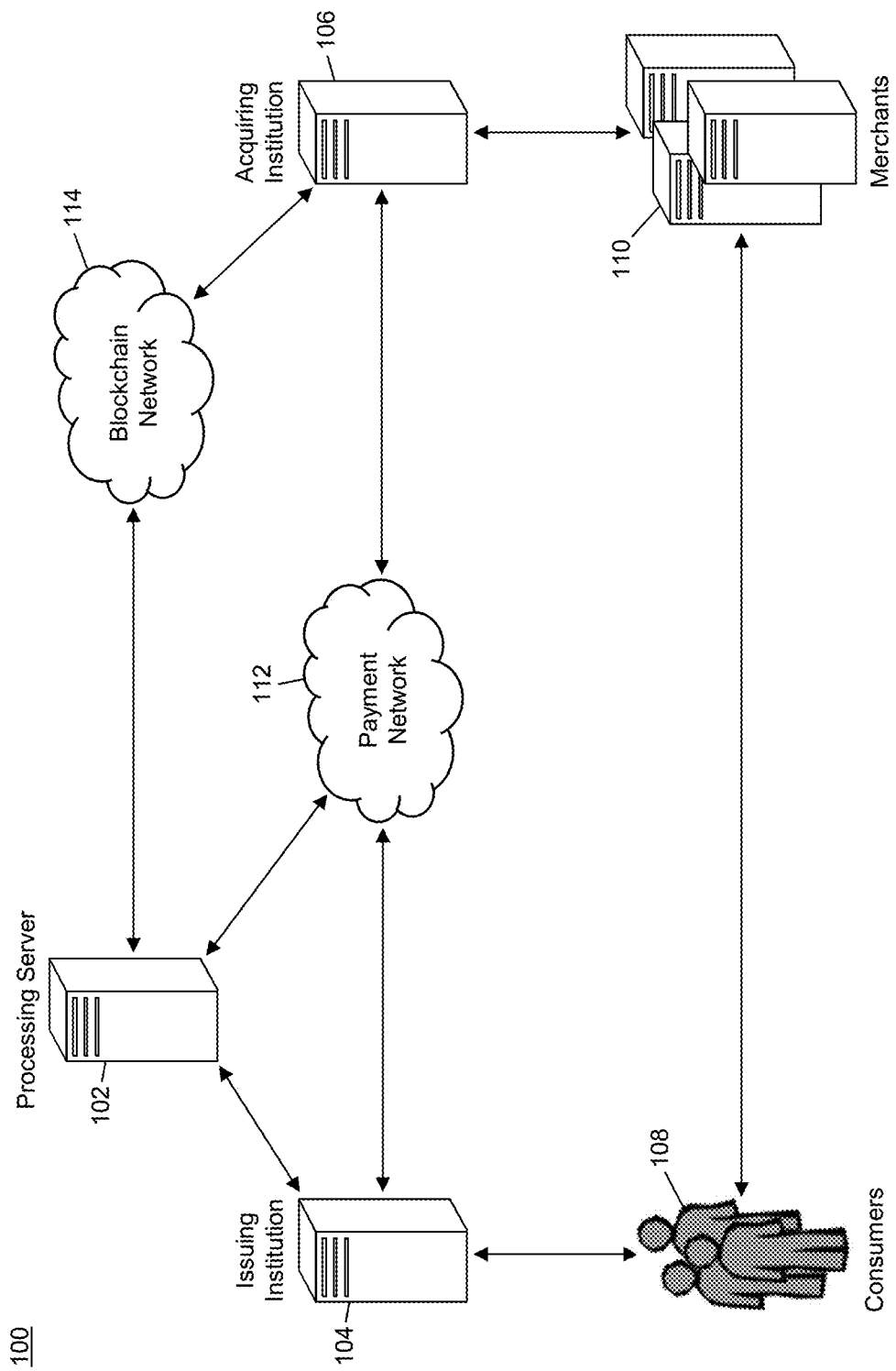
FIG. 1 is a block diagram illustrating a high level system architecture for generating cryptographic promissory notes for net settlement using a blockchain in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency. As used herein, "blockchain" may refer to any type of public, shared ledger that may operate similar thereto and be suitable for performing the functions discussed herein.

System for Net Settlement Using Cryptographic Promissory Notes

FIG. 1 illustrates a system 100 for the generation of cryptographic promissory notes for posting to a blockchain for use in net settlement of payment transactions.

The system 100 may include a processing server 102. The processing server 102, discussed in more detail below, may be configured to generate cryptographic promissory notes for payment transactions, where the promissory notes may represent promises for payment related to payment transactions that may be used in net settlement performed for payment transactions conducted during a predetermined period of time (e.g., hourly, daily, weekly, etc.). The cryptographic promissory notes may be promises for an issuing institution 104 to pay an acquiring institution 106 for one or more payment transactions involving account holders associated therewith. In some embodiments, the processing server 102 may be a part of the issuing institution 104. In other embodiments, the processing server 102 may be external to, but may be in communication with, the issuing institution 104.

The issuing institution 104 may be a financial institution, such as an issuing bank, or other entity configured to issue transaction accounts to consumers 108 for use in funding payment transactions. The acquiring institution 106 may be a financial institution, such as an acquiring bank, or other entity configured to issue transaction accounts to merchants 110 for use in receiving funds as part of payment transactions. Settlement may include the transfer or funds from the issuing institution 104 to the acquiring institution 106 based on payment transactions conducted between the consumers 108 associated with the issuing institution 104 and merchants 110 associated with the acquiring institution 106 during the predetermined period of time.

A cryptographic promissory note may be generated by the processing server 102 for each payment transaction involving the issuing institution 104 that is processed. A consumer 108, as a customer of the issuing institution 104 to which a transaction account is issued, may initiate a payment transaction with a merchant 110. The merchant 110 may electronically transmit transaction data for the payment transaction, including payment credentials associated with a transaction account issued by the issuing institution 104, to their associated acquiring institution 106. The acquiring institution 106 may generate an authorization request for the payment transaction, which may be submitted to a payment network 112 using payment rails associated therewith.

An authorization request may be a transaction message that includes a message type indicator indicative of an authorization request, where authorization of the related payment transaction is being requested. A transaction message may be a specially formatted data message that is formatted pursuant to one or more standards governing the exchange of financial transaction messages, such as the International Organization of Standardization's ISO 8583 or ISO 20022 standards. Transaction messages may include message type indicators as well as a plurality of data elements, where each data element is configured to store transaction data for the related payment transaction. Transaction data may include, for example, transaction amount, transaction time, transaction date, primary account number, other payment credentials, geographic location, merchant name, merchant identifier, merchant category code, currency type, product data, offer data, reward data, loyalty data, issuer data, acquirer data, etc. In some instances, a transaction message may also include one or more bitmaps, which may be configured to indicate the data elements included in the transaction message and the data stored therein.

The payment network 112 may receive an authorization request from the acquiring institution 106 for the payment transaction, which, in traditional systems, may be forwarded on to the issuing institution 104 for approval or denial. In the system 100, the processing server 102 may receive the authorization request for generation of the cryptographic promissory note. In some embodiments, the processing server 102 may receive the authorization request directly from the payment network 112 for generation of the promissory note prior to forwarding of the authorization request to the issuing institution 104. In other embodiments, the processing server 102 may receive the authorization request from the issuing institution 104. In such embodiments, the issuing institution 104 may forward the authorization request to the processing server 102 prior to approval or denial of the payment transaction, or, in other cases, may only forward the authorization request to the processing server 102 for generation of cryptographic promissory notes for payment transactions that have been approved.

The processing server 102 may receive the authorization request and may generate a promissory note based thereon. The promissory note may include at least the transaction amount and other transaction data parsed from the received authorization request, such as data identifying the issuing institution 104 as the promisor and the acquiring institution 106 as the beneficiary. For instance, the promissory note may include an identifier associated with each institution, such as a bank identification number, issuer identification number, registration number, serial number, network address, etc. The promissory note may also include any additional data that may be used in the settlement based thereon, such as a timestamp, transaction identifier, etc.

Once the promissory note has been generated, the processing server 102 may digitally sign the promissory note. The digital signature may be applied using a private key associated with the processing server 102. The private key may be a private key in a key pair generated by or otherwise supplied to the processing server 102, for which there is a corresponding public key. The digital signature may be such that the signature may be verified using the corresponding public key. For example, as discussed below, the issuing institution 104 or acquiring institution 106 may be provided with the corresponding public key for use in validation of the digital signature of the promissory note.

Once the promissory note has been signed, the processing server 102 may encrypt the signed promissory note. The promissory note may be encrypted using a symmetric key generated or otherwise identified by the processing server 102. The encryption may be performed using any suitable encryption algorithm that will be apparent to persons having skill in the relevant art. In some embodiments, the symmetric key may be specific to the payment transaction and/or the generated promissory note, such that the symmetric key may not be used in the encryption or decryption of any other promissory note.

The symmetric key used to encrypt promissory note may then be wrapped with one or more keys using a suitable symmetric encryption algorithm. Any suitable encryption algorithm that is designed to encapsulate cryptographic material may be used, such as the Advanced Encryption Standard Key Wrap Specification, Triple Data Encryption Algorithm Key Wrap Specification, etc. The symmetric key may be wrapped with at least one of: the public key that corresponds to the private key used to sign the promissory note and a public key associated with the acquiring institution 106 involved in the payment transaction. In some instances, the public key associated with the acquiring institution 106 may be stored in a data element included in the authorization request and parsed therefrom by the processing server 102. In some embodiments, the symmetric key may also be wrapped with a public key associated with the payment network 112. Each of the public keys used to wrap the symmetric key may be one half of a key pair where there is a corresponding private key, which may be in possession of the respective associated entity.

Once the symmetric key used to encrypt promissory note has been wrapped, the processing server 102 may electronically transmit the encrypted promissory note and each of the wrapped symmetric keys (e.g., for the acquiring institution 106, for the payment network 112, etc.) to a blockchain network 114 for posting to an associated blockchain. In some embodiments, the processing server 102 itself may be a node in the blockchain network 114 and may be configured to include the encrypted promissory note in a block that is to be added to the blockchain. In some instances, encrypted promissory notes that are added to the blockchain may be associated with a specific blockchain address. In such instances, the blockchain address may be associated with the acquiring institution 106, and may be stored in a corresponding data element in the received authorization request, which may be parsed therefrom by the processing server 102. In these instances, the processing server 102 may provide the encrypted promissory note and the blockchain address to the node of the blockchain network 114 for posting thereto.

The blockchain network 114 may receive the encrypted promissory note and wrapped symmetric keys, which may be included in a block that is verified and added to the blockchain using traditional methods and systems that will be apparent to persons having skill in the relevant art. The existence of the encrypted promissory note, particularly when associated with an address of the acquiring institution 106, in the blockchain, which is immutable, thus serves as verification to the acquiring institution 106 of the payment owed to the acquiring institution 106 by the issuing institution 104. In some cases, the blockchain may be updated at or near real-time, such that the acquiring institution 106 may be able to identify the promissory notes significantly faster than settlement is performed, enabling the acquiring institution 106 to have more efficient and accurate accounting.

Following the transmission of the encrypted promissory note to the blockchain network 114, the processing server 102 may proceed with the processing of the payment transaction. In some embodiments, the processing server 102 may forward the authorization request to the issuing institution 104 for further processing using traditional methods and systems. Traditional processes for the processing of a payment transaction using the payment rails is discussed in more detail below with respect to the process 600 illustrated in FIG. 6. In such instances, the issuing institution 104 may approve or deny the payment transaction and forward an authorization response indicative thereof to the payment network 112, which, in some cases, may be forwarded via the processing server 102.

The process may be repeated for a plurality of different payment transactions, where promissory notes may be generated and posted to the blockchain associated with the blockchain network 114 over the course of the predetermined period of time. The payment transactions may then be settled by the payment network 112 using traditional methods for settlement. In some embodiments, settlement of a payment transaction may be initiated by the acquiring institution 106, such as by transferring one or more promissory notes (e.g., posted on the blockchain to the address associated with the acquiring institution 106) to an address associated with an entity configured to perform settlement (e.g., the payment network 112). The receiving entity may then perform net settlement on the received promissory notes. In some cases, once a promissory note has been settled, the promissory notes may again be transferred to another address, which may be a null address or an address associated with a different entity (e.g., an auditor, storage entity, etc.) as an indication that the related payment transaction has been settled. In instances where settlement may fail (e.g., due to error, nonpayment by the issuing institution 104, etc.), the promissory note may be transferred back to the acquiring institution 106, such that the acquiring institution 106 may retain the promissory note for a later attempt at settlement, further transfer, exchange for value, etc. In some such instances, the acquiring institution 106 may also be provided with data to indicate a reason for the transfer, such as an indication as to why the settlement failed.

In some cases, the values used for settlement may be based on the values of the promissory notes that were posted to the blockchain during the predetermined period of time. For instance, if there is a first promissory note for payment from the issuing institution 104 to the acquiring institution 106, and a second promissory note for payment from the acquiring institution 106 (e.g., as an issuer) to the issuing institution 104 (e.g., as an acquirer), then the settlement may be based on the net amount to be paid when both promissory notes are considered together.

In some embodiments, the effective value of a promissory note may be identified via the use of a stack machine or other suitable type of computing device. For instance, in such an embodiment, the promissory note may be accompanied by a script that is attached thereto in the blockchain network. The script, which may be generated or otherwise identified by the processing server 102 during the processes discussed herein, may be executed by a stack machine (e.g., or other suitable device) and used to determine the value of the promissory note. The face value of the promissory note may be pushed to the stack machine and then the associated script executed, such that the value on the stack machine following completion of the script is the effective value of the promissory note. In some instances, the effective value may be different from the face value due to fees, currency exchanges, inflation, and other considerations, such as an interchange fee charged for the processing of the related payment transaction.

In some embodiments, the script may be separate from the promissory note to which it is related. In such embodiments, the processing server 102 may be configured to electronically transmit the script to the blockchain network 114 for posting to the blockchain separately from the encrypted promissory note and/or to the acquiring institution 106 for execution thereby. For instance, in one example, the script may be transmitted to a node blockchain network 114. The acquiring institution 106 may, such as upon receipt of the promissory note (e.g., transferred to the address associated with the acquiring institution 106), request the script from the applicable entity, such as the payment network 112 or the blockchain network 114. The blockchain network 114 may then post the script to the blockchain, and provide the address of the script on the blockchain to the acquiring institution 106 for retrieval. In another example, the script may be included in a data element of the transaction message returned to the acquiring institution 106 for the payment transaction.

In some embodiments, promissory notes may be held in escrow prior to being transferred to the acquiring institution 106 for settlement. In such instances, the encrypted promissory notes may be posted to the blockchain using a blockchain address that may be indicative of escrow and controlled by the processing server 102, or may be associated with a computing system of a third party escrow entity. In such embodiments, the processing server 102 may generate a promissory note as a promise to pay a specific acquiring institution 106, which may be transferred to the escrow system. Upon the receipt of a second authorization request for a payment transaction involving the same acquiring institution 106, a new promissory note may be generated that incorporates both payment transactions. For instance, the promissory note may be for an amount that is the sum of both payment transactions. In such cases, the processing server 102 may continue to generate and transfer new promissory notes to update the promised payment to be made to the acquiring institution 106.

The escrow system (e.g., or the processing server 102, as applicable), may be configured to transfer the latest promissory note to the acquiring institution 106 on the blockchain via the blockchain address associated therewith, to enable the acquiring institution 106 to initiate settlement of the amount indicated thereby. The escrow system may also transfer all of the prior promissory notes associated therewith to a null address or other address where they will be unavailable for settlement, due to the inclusion of the associated transactions in the promissory note transferred to the acquiring institution 106. In some embodiments, the transfer of the latest promissory note may be initiated upon request of the issuing institution 104 or processing server 102. In some instances, such a request may be provided at a predetermined period of time or based on other criteria, such as the face or effective value of the promissory note. In other instances, the escrow system may transfer the promissory note automatically based on the same or other suitable criteria. In some instances, the issuing institution 104 may be required to provide proof of the transfer of a new promissory note for delivery to the acquiring institution 106, or proof of actual transfer thereto, prior to the disposal (e.g., transfer to a null address) of previously escrowed promissory notes.

The methods and systems discussed herein may provide for a decentralized accounting of promissory notes that are used in net settlement of payment transactions via the use of a blockchain. The blockchain may provide an immutable ledger of transaction records for promissory notes, which may be accessed by financial institutions at any time, thus enabling the financial institution to determine their net position even prior to settlement being performed. In addition, settlement may also be initiated by the financial institution at any time via the transfer of the promissory notes, enabling faster settlement and at a schedule that is more suitable to the financial institution than available using traditional systems.

Processing Server

Figure 2:
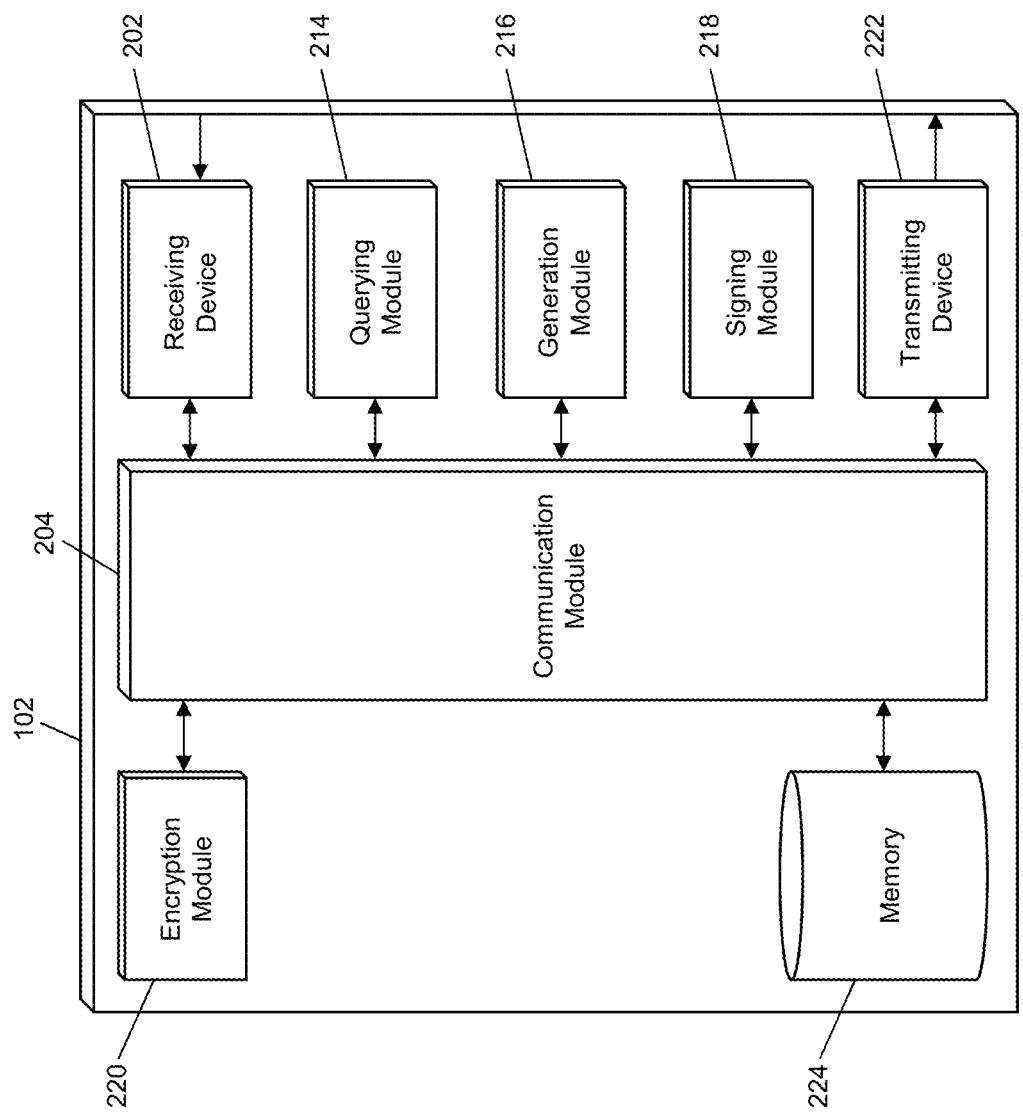
FIG. 2 is a block diagram illustrating the processing server of the system of FIG. 1 for the generation of cryptographic promissory notes in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 112 for the transmission of transaction messages that include sensitive financial data and information. In some instances, the receiving device 202 may also be configured to receive data from issuing institutions 104, payment networks 112, blockchain networks 114, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 104 and/or payment networks 112 that may be superimposed or otherwise encoded with transaction messages, including authorization requests for payment transactions for which promissory notes are to be generated. The receiving device 202 may also be configured to receive data signals electronically transmitted by issuing institutions 104 that may be superimposed or otherwise encoded with a request for transfer of one or more promissory notes, such as for the release of a promissory note from escrow to an acquiring institution 106.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, signing module 218, encryption module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a querying module 214. The querying module 214 may be configured to execute queries on databases to identify information. The querying module 214 may receive one or more data values or query strings, and may execute a query string based thereon on an indicated database, such as a memory 224, to identify information stored therein. The querying module 214 may then output the identified information to an appropriate engine or module of the processing server 102 as necessary. The querying module 214 may, for example, execute a query on the memory 224 to identify private keys used for the signing of promissory notes, symmetric keys used for encrypting signed promissory notes, and public keys for use in wrapping a symmetric key used to encrypt a promissory note.

The processing server 102 may also include a generation module 216. The generation module 216 may be configured to generate promissory notes and other data for use in performing the functions of the processing server 102 as discussed herein. The generation module 216 may receive an instruction as input, may generate data as instructed, and may output the generated data to another module or engine of the processing server 102. For example, the generation module 216 may be configured to generate a promissory note based on data included in an authorization request, such as the transaction amount, issuer identifier, merchant identifier, transaction time, etc., which may be parsed from the authorization request. The generation module 216 may also be configured to generate symmetric keys and key pairs for use in performing the functions of the processing server 102 as discussed herein, using suitable key generation algorithms that will be apparent to persons having skill in the relevant art. In some embodiments, the generation module 216 may also be configured to generate a script, which may be executed on a stack machine (e.g., or other suitable type of computing device) to identify the effective value of the corresponding promissory note.

The processing server 102 may also include a signing module 218. The signing module 218 may be configured to digitally sign data using suitable methods. The signing module 218 may receive data to be signed, my digitally sign the data using a suitable signature algorithm and/or method, and may output the signed data to another module or engine of the processing server 102. For example, the signing module 218 may be configured to digitally sign a promissory note (e.g., generated by the generation module 216) using a private key stored in the memory 224 (e.g., identified via the querying module 214).

The processing server 102 may also include an encryption module 220. The encryption module 220 may be configured to encrypt data for use in performing the functions of the processing server 102 as discussed herein. The encryption module 220 may receive data to be encrypted as input, may encrypt the data, and may output the encrypted data to another module or engine of the processing server 102. In some instances, the key and/or algorithm to be used in the encryption may be included in the input. In other instances, the encryption module 220 may be configured to identify the key and/or algorithm to use, such as by instructing the querying module 214 to execute a query on the memory 224 to identify a symmetric key and/or an encryption algorithm, or by instructing the generation module 216 to generate a symmetric key for a promissory note. The encryption module 220 may also be configured to wrap symmetric keys (e.g., used to encrypt promissory notes) with other keys, such as with a public key associated with the processing server 102 (e.g., stored in the memory 224) and a public key associated with an acquiring institution 106 involved in the related payment transaction, such as may be parsed from the corresponding authorization request, or keys associated with other entities, such as financial regulators, governmental agencies, auditors, etc. In some instances, the symmetric key may also be wrapped with a public key associated with the payment network 112.

The processing server 102 may also include a transmitting device 222. The transmitting device 222 may be configured to transmit data over one or more networks via one or more network protocols. In some embodiments, the transmitting device 222 may be configured to transmit data over the payment rails, such as using specially configured infrastructure associated with payment networks 112 for the transmission of transaction messages that include sensitive financial data and information, such as identified payment credentials. In some instances, the transmitting device 222 may be configured to transmit data to issuing institutions 104, payment networks 112, blockchain networks 114, and other entities via alternative networks, such as the Internet. In some embodiments, the transmitting device 222 may be comprised of multiple devices, such as different transmitting devices for transmitting data over different networks, such as a first transmitting device for transmitting data over the payment rails and a second transmitting device for transmitting data over the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to blockchain networks 114 and nodes associated therewith that are superimposed or otherwise encoded with encrypted promissory notes, wrapped symmetric keys, and corresponding blockchain addresses. In some instances, the encrypted promissory notes may also be accompanied by scripts used for the valuation thereof. In some embodiments, the transmitting device 222 may also be configured to electronically transmit data signals to escrow systems that are superimposed or otherwise encoded with instructions for transferring promissory notes, such as for transfer to an acquiring institution 106 for settlement thereof.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein.

Process for Generation and Posting of a Cryptographic Promissory Note

FIG. 3 illustrates a process for the generation of a cryptographic promissory note for posting to a blockchain for use in performing settlement of a related payment transaction in the system 100 illustrated in FIG. 1.

In step 302, the payment network 112 may forward an authorization request for a payment transaction to the processing server 102. The authorization request may be a transaction message for the payment transaction that is formatted based on one or more standards, such as the ISO 8583 or 20022 standards, and may be received from an acquiring institution 106 via payment rails associated with the payment network 112. In some instances, the authorization request may be forwarded to the processing server 102 via the issuing institution 104. In some cases, the issuing institution 104 may approve the payment transaction prior to forwarding of the authorization request to the processing server 102.

In step 304, the receiving device 202 of the processing server 102 may receive the authorization request. The authorization request may include a plurality of data elements, including at least a first data element configured to store a transaction amount and a second data element configured to store a blockchain address. In some instances, additional data elements included in the authorization request may store a public key associated with the acquiring institution 106, a public key associated with the payment network 112, or other data that may be used in the generation and transfer of promissory notes as discussed herein. In step 306, the generation module 216 of the processing server 102 may generate a promissory note that represents a promise for the issuing institution 104 to pay the acquiring institution 106 an amount based on the transaction amount parsed from the authorization request (e.g., less an interchange fee or other fees or expenses associated therewith).

In step 308, the signing module 218 of the processing server 102 may digitally sign the generated promissory note using a private key, which may be associated with the issuing institution 104 and/or processing server 102 that is part of a key pair comprised of the private key and a corresponding public key. In some instances, the private key may be stored in the memory 224 of the processing server 102 and identified via a query thereof by the querying module 214. In other instances, the generation module 216 may generate the key pair using a suitable key generation algorithm.

In step 310, the encryption module 220 of the processing server 102 may encrypt the signed promissory note using a symmetric key. In some instances, the symmetric key may be unique to the signed promissory note. In such instances, the symmetric key may be previously generated and identified by the processing server 102 (e.g., via a query on the memory 224 executed by the querying module 214). In other such instances, the generation module 216 may generate the symmetric key for use with the promissory note using a suitable key generation algorithm. In step 312, the encryption module 220 may wrap the symmetric key used to encrypt the promissory note with the public key of the key pair associated with the processing server 102 and the public key associated with the acquiring institution 106, which may be parsed from the authorization request or identified in the memory 224 using data stored therein, as applicable. In some instances, the symmetric key may also be wrapped with a public key associated with the payment network 112, and any additional keys that may be used in conjunction with the processes discussed herein.

In step 314, the transmitting device 222 of the processing server 102 may electronically transmit the encrypted promissory note, each wrapped symmetric key, and blockchain address parsed from the authorization request to the blockchain network 114 for posting to the blockchain. In step 316, the blockchain network 114 may receive the data for the blockchain transaction. In some instances, the data may also include a script (e.g., generated by the generation module 216 of the processing server 102) configured for execution on a stack machine to identify the effective value of the promissory note based on its face value.

In step 318, the blockchain network 114, or a node associated therewith, may post the transaction to the blockchain via the inclusion of the transaction in a block that is verified based on the specifications of the blockchain. The transaction may be such that the encrypted promissory note is transferred to the blockchain address for control by an entity associated therewith, such as the acquiring institution 106. As part of the posting of the blockchain transaction, the blockchain network 114 may generate or otherwise identify an identifier associated with the blockchain transaction. The identifier may be a unique value associated with the blockchain transaction, such as an identification number or a hash value generated via hashing of the encrypted promissory note. In step 320, the blockchain network 114 may forward the transaction identifier to the processing server 102, which may be received by the receiving device 202 of the processing server 102, in step 322.

In step 324, the generation module 216 of the processing server 102 may generate an authorization response for the payment transaction, where the authorization response includes a data element configured to store the transaction identifier for the corresponding blockchain transaction. In step 326, the transmitting device 222 may submit the authorization response to the payment network 112, which may receive the authorization response in step 328 and proceed with processing the payment transaction using traditional methods and systems. In some embodiments, steps 324 and 326 may be performed by the issuing institution 104. In such embodiments, the processing server 102 may forward the transaction identifier to the issuing institution 104 for inclusion in the authorization response, which may indicate approval or denial of the payment transaction based on additional considerations, such as credit limit, fraud scoring, and other criteria that will be apparent to persons having skill in the relevant art. In some embodiments, the transaction identifier may also be stored or otherwise associated with the authorization request, for identification thereof.

Process for Escrow of Cryptographic Promissory Notes

Figure 4:
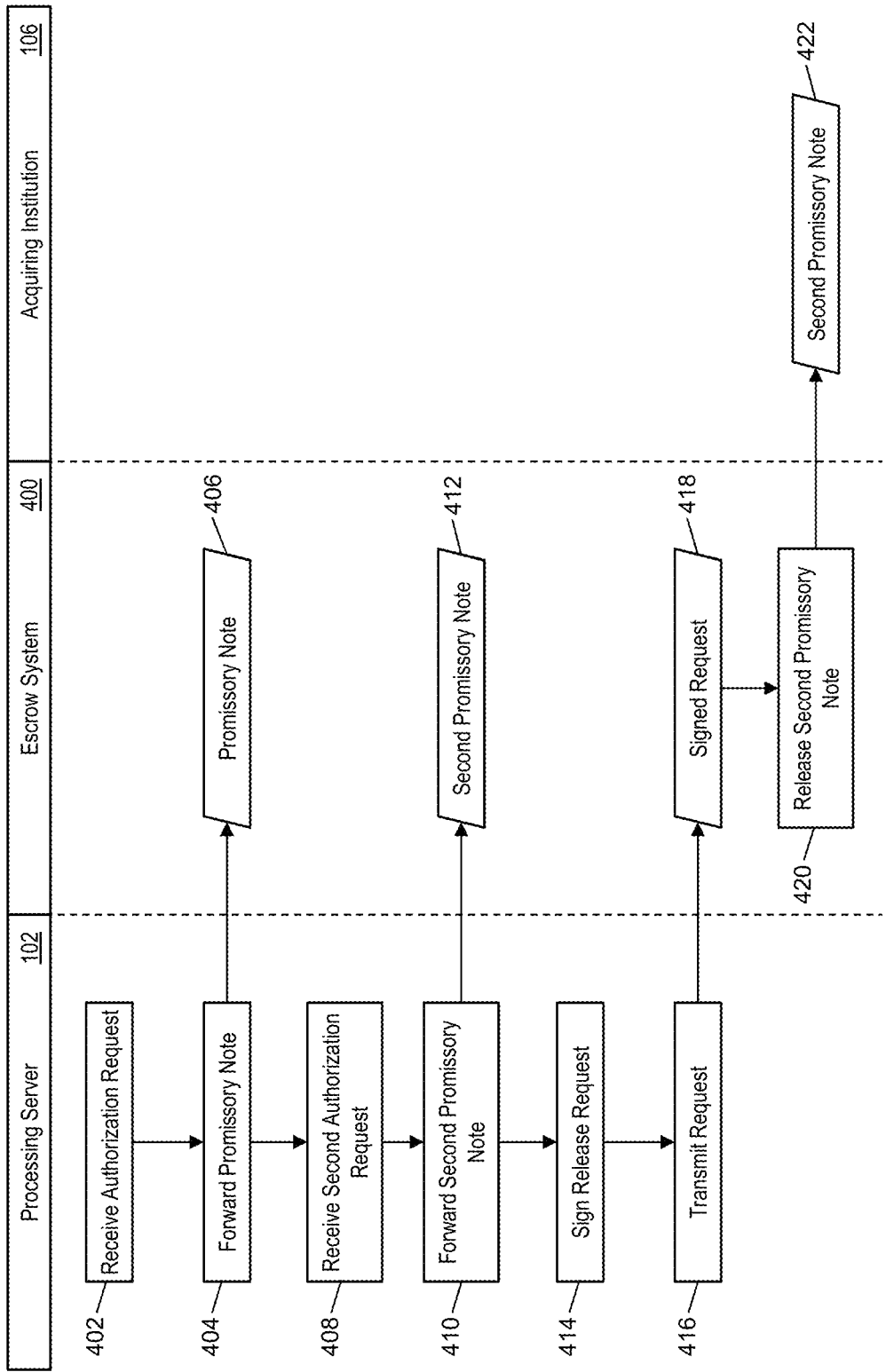
FIG. 4 is a flow diagram illustrating a process for the use of an escrow system for net settlement using a plurality of promissory notes in the system of FIG. 1 in accordance with exemplary embodiments.

FIG. 4 illustrates a process for the use of an escrow system 400 in the system 100 for the escrow of cryptographic promissory notes generated by the processing server 102 prior to transfer to an acquiring institution 106 for settlement thereof.

Figure 3A:
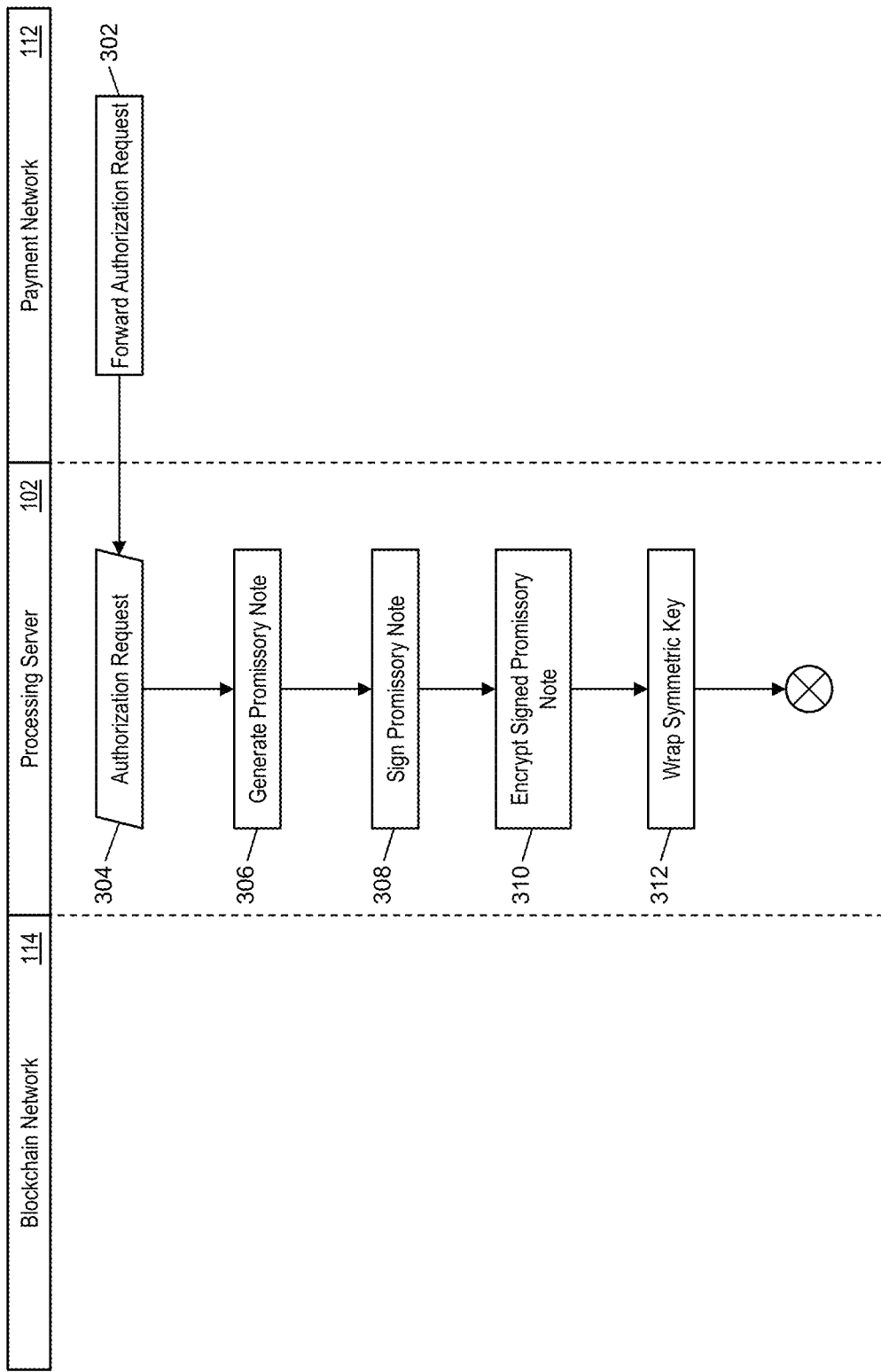

In step 402, the receiving device 202 of the processing server 102 may receive an authorization request for a first payment transaction involving the issuing institution 104 and the acquiring institution 106. In step 404, the processing server 102 may generate, sign, and encrypt a promissory note using the methods discussed herein (e.g., such as illustrated in FIGS. 3A and 3B and discussed above) for the payment transaction, which may be electronically transmitted by the transmitting device 222 of the processing server 102 to the escrow system 400 using a suitable communication network and method. In step 406, the escrow system 400 may receive the promissory note. In some embodiments, the transmission and receipt of the promissory note may utilize the blockchain network 114, where the promissory note may be transferred to the escrow system 400 via the blockchain by the posting of a transaction including the promissory note to a blockchain address associated with the escrow system 400.

In step 408, the receiving device 202 of the processing server 102 may receive an authorization request for a second payment transaction that involves both the issuing institution 104 and the acquiring institution 106. In step 410, the processing server 102 may generate, sign, and encrypt a second promissory note using the methods discussed herein, where the second promissory note is for an amount based on both the first and second payment transactions, such as a summed amount of both transactions. The transmitting device 222 of the processing server 102 may electronically transmit the second promissory note to the escrow system 400, which may receive the note in step 412. As discussed above, in some instances, the second promissory note may be transferred to the escrow system 400 via the blockchain network 114.

In step 414, the processing server 102 may generate (e.g., via the generation module 216) and sign (e.g., via the signing module 218) a release request, which may be a request directed to the escrow system 400 to release the latest promissory note to the acquiring institution 106. In some cases, the request may be signed using the private key associated with the processing server 102 used to sign the promissory notes. In some instances, step 414 may be initiated based on the receipt of a request from the issuing institution 104. In other instances, step 414 may be initiated based on predetermined criteria, such as the expiration of a predetermined period of time (e.g., hourly, daily, weekly, etc.), the surpassing of a predetermined amount (e.g., the promised amount exceeds $5,000), the transfer of a predetermined number of promissory notes to the escrow system 400 (e.g., after ten notes have been transferred), etc. In step 416, the transmitting device 222 of the processing server 102 may electronically transmit the signed request to the escrow system 400.

In step 418, the escrow system 400 may receive the signed request. In some embodiments, the escrow system 400 may validate the signature on the request, such as using a public key corresponding to the private key associated with the processing server 102 and used to sign the request. In step 420, the escrow system 400 may release the second promissory note (e.g., or other promissory note as indicated in the release request, as applicable) to the acquiring institution 106. In some embodiments, release of the promissory note may include the transfer of the promissory note using the blockchain network 114, where the promissory note may be transferred to a blockchain address associated with the acquiring institution 106, such as may be parsed from the authorization requests received by the processing server 102. In step 422, the acquiring institution 106 may receive the promissory note, where the acquiring institution 106 may be able to initiate settlement thereof, such as using the payment network 112, to receive the effective value of the promissory note from the issuing institution 104.

Exemplary Method for Generating a Cryptographic Promissory Note

Figure 5:
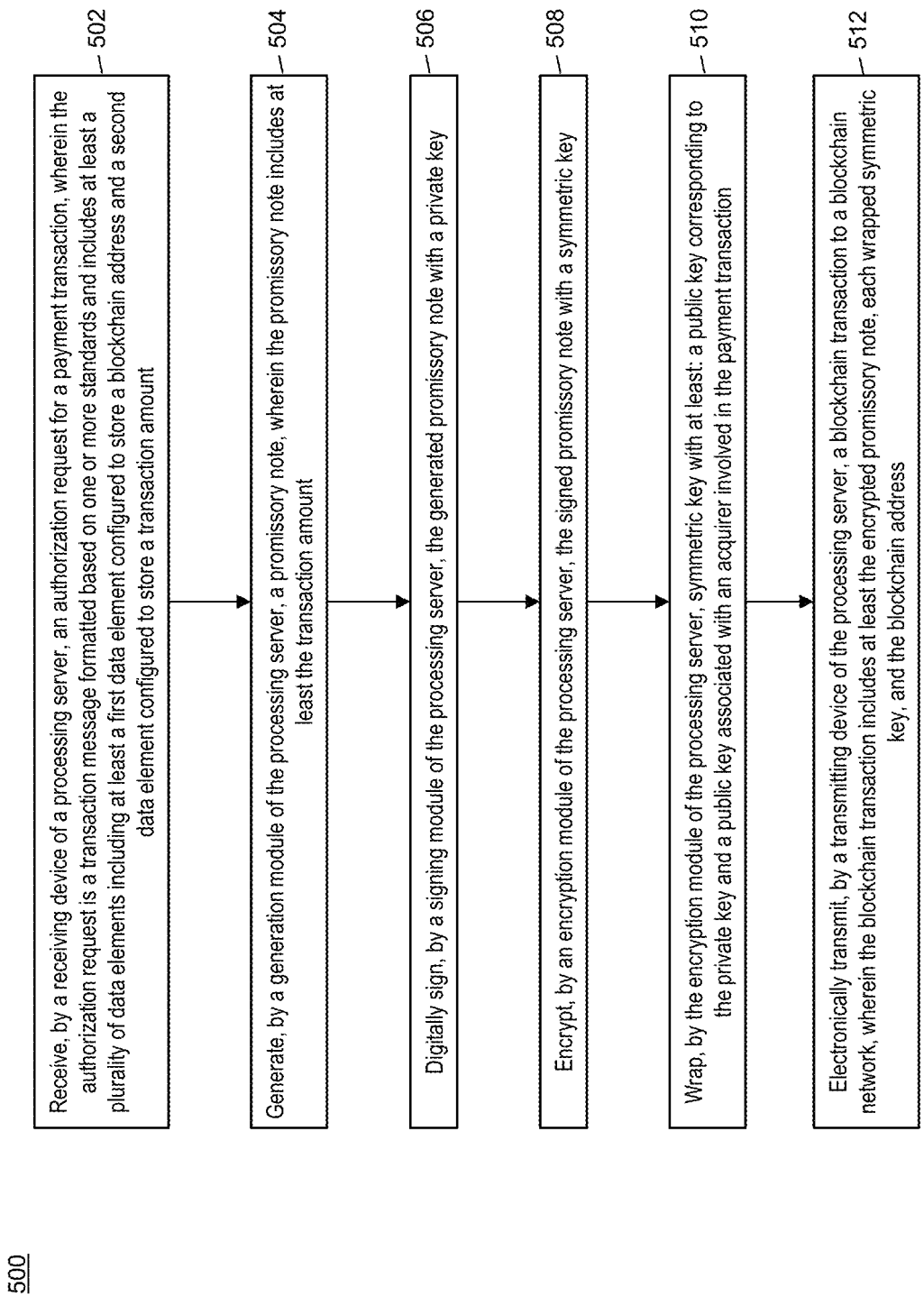
FIG. 5 is a flow chart illustrating an exemplary method for generating a cryptographic promissory note for posting to a blockchain in accordance with exemplary embodiments.

FIG. 5 illustrates a method 500 for the generation of a cryptographic promissory note for posting to a blockchain.

In step 502, an authorization request for a payment transaction may be received by a receiving device (e.g., the receiving device 202) of a processing server (e.g., the processing server 102), wherein the authorization request is a transaction message formatted based on one or more standards and includes at least a plurality of data elements including at least a first data element configured to store a blockchain address and a second data element configured to store a transaction amount. In step 504, a promissory note may be generated by a generation module (e.g., the generation module 216) of the processing server, wherein the promissory note includes at least the transaction amount.

In step 506, the generated promissory note may be digitally signed by a signing module (e.g., the signing module 218) of the processing server with a private key. In step 508, the signed promissory note may be encrypted by an encryption module (e.g., the encryption module 220) of the processing server with a symmetric key.

In step 510, the symmetric key used to encrypt the promissory note may be wrapped by the encryption module of the processing server with at least: a public key corresponding to the private key and a public key associated with an acquirer (e.g., the acquiring institution 106) involved in the payment transaction. In step 512, a blockchain transaction may be electronically transmitted to a blockchain network (e.g., the blockchain network 114), wherein the blockchain transaction includes at least the encrypted promissory note, each wrapped symmetric key, and the blockchain address.

In one embodiment, the public key associated with the acquirer may be stored in a third data element included in the received authorization request. In some embodiments, the symmetric key may be further wrapped with a public key associated with a payment network (e.g., the payment network 112). In a further embodiment, the authorization request may be received from the payment network. In another further embodiment, the public key associated with the payment network may be stored in a third data element included in the received authorization request.

In one embodiment, the method 500 may further include: receiving, by the receiving device, a transaction identifier associated with the blockchain transaction from the blockchain network; generating, by the generation module of the processing server, an authorization response for the payment transaction, wherein the authorization response is a transaction message formatted based on the one or more standards and includes the plurality of data elements further including a third data element configured to store the transaction identifier; and electronically transmitting, by the transmitting device of the processing server, the generated authorization response. In a further embodiment, the authorization request may be received from a payment network, and the generated authorization response may be electronically transmitted to the payment network.

In some embodiments, the private key may be stored in a memory (e.g., the memory 224) of the processing server. In one embodiment, the symmetric key may be unique to the generated promissory note. In some embodiments, the method 500 may also include generating, by the generation module of the processing server, a valuation script based on at least the generated promissory note configured to determine a value of the generated promissory note, wherein the blockchain transaction further includes the generated valuation script.

Payment Transaction Processing System and Process

Figure 6:
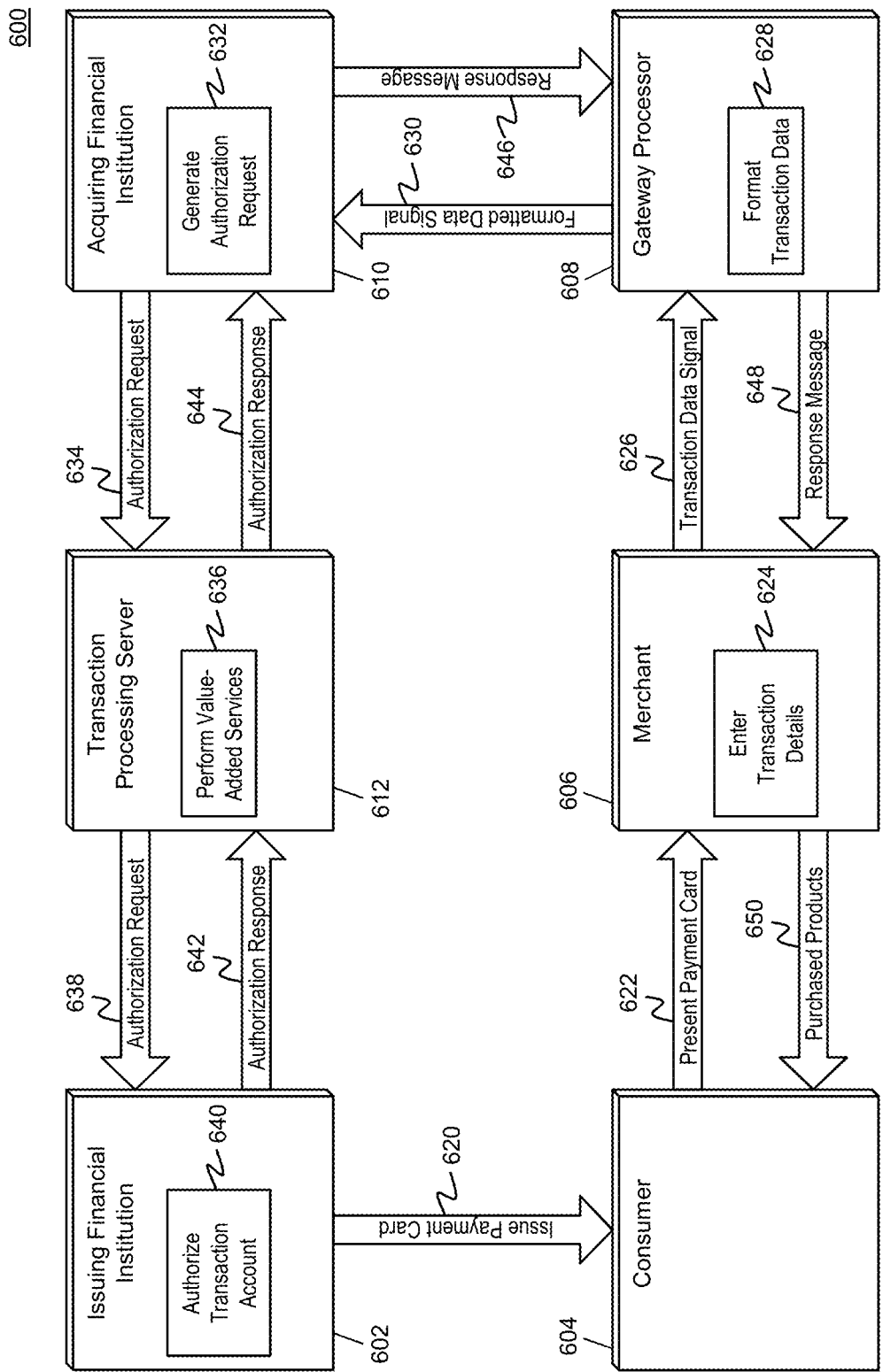
FIG. 6 is a flow diagram illustrating the processing of a payment transaction in accordance with exemplary embodiments.

FIG. 6 illustrates a transaction processing system and a process 600 for the processing of payment transactions in the system, which may include the processing of thousands, millions, or even billions of transactions during a given period (e.g., hourly, daily, weekly, etc.). The process 600 and steps included therein may be performed by one or more components of the system 100 discussed above, such as the processing server 102, issuing institution 104, acquiring institution 106, consumers 108, merchants 110, payment network 112, etc. The processing of payment transactions using the system and process 600 illustrated in FIG. 6 and discussed below may utilize the payment rails, which may be comprised of the computing devices and infrastructure utilized to perform the steps of the process 600 as specially configured and programmed by the entities discussed below, including the transaction processing server 612, which may be associated with one or more payment networks configured to processing payment transactions. It will be apparent to persons having skill in the relevant art that the process 600 may be incorporated into the processes illustrated in FIGS.

3A, 3B, 4, and 5, discussed above, with respect to the step or steps involved in the processing of a payment transaction. In addition, the entities discussed herein for performing the process 600 may include one or more computing devices or systems configured to perform the functions discussed below. For instance, the merchant 606 may be comprised of one or more point of sale devices, a local communication network, a computing server, and other devices configured to perform the functions discussed below.

In step 620, an issuing financial institution 602 may issue a payment card or other suitable payment instrument to a consumer 604. The issuing financial institution may be a financial institution, such as a bank, or other suitable type of entity that administers and manages payment accounts and/or payment instruments for use with payment accounts that can be used to fund payment transactions. The consumer 604 may have a transaction account with the issuing financial institution 602 for which the issued payment card is associated, such that, when used in a payment transaction, the payment transaction is funded by the associated transaction account. In some embodiments, the payment card may be issued to the consumer 604 physically. In other embodiments, the payment card may be a virtual payment card or otherwise provisioned to the consumer 604 in an electronic format.

In step 622, the consumer 604 may present the issued payment card to a merchant 606 for use in funding a payment transaction. The merchant 606 may be a business, another consumer, or any entity that may engage in a payment transaction with the consumer 604. The payment card may be presented by the consumer 604 via providing the physical card to the merchant 606, electronically transmitting (e.g., via near field communication, wireless transmission, or other suitable electronic transmission type and protocol) payment details for the payment card, or initiating transmission of payment details to the merchant 606 via a third party. The merchant 606 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 624, the merchant 606 may enter transaction details into a point of sale computing system. The transaction details may include the payment details provided by the consumer 604 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 606 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 606 may be an online retailer in an e-commerce transaction. In such embodiments, the transaction details may be entered in a shopping cart or other repository for storing transaction data in an electronic transaction as will be apparent to persons having skill in the relevant art.

In step 626, the merchant 606 may electronically transmit a data signal superimposed with transaction data to a gateway processor 608. The gateway processor 608 may be an entity configured to receive transaction details from a merchant 606 for formatting and transmission to an acquiring financial institution 610. In some instances, a gateway processor 608 may be associated with a plurality of merchants 606 and a plurality of acquiring financial institutions 610. In such instances, the gateway processor 608 may receive transaction details for a plurality of different transactions involving various merchants, which may be forwarded on to appropriate acquiring financial institutions 610. By having relationships with multiple acquiring financial institutions 610 and having the requisite infrastructure to communicate with financial institutions using the payment rails, such as using application programming interfaces associated with the gateway processor 608 or financial institutions used for the submission, receipt, and retrieval of data, a gateway processor 608 may act as an intermediary for a merchant 606 to be able to conduct payment transactions via a single communication channel and format with the gateway processor 608, without having to maintain relationships with multiple acquiring financial institutions 610 and payment processors and the hardware associated thereto. Acquiring financial institutions 610 may be financial institutions, such as banks, or other entities that administers and manages payment accounts and/or payment instruments for use with payment accounts. In some instances, acquiring financial institutions 610 may manage transaction accounts for merchants 606. In some cases, a single financial institution may operate as both an issuing financial institution 602 and an acquiring financial institution 610.

The data signal transmitted from the merchant 606 to the gateway processor 608 may be superimposed with the transaction details for the payment transaction, which may be formatted based on one or more standards. In some embodiments, the standards may be set forth by the gateway processor 608, which may use a unique, proprietary format for the transmission of transaction data to/from the gateway processor 608. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 608.

In step 628, the gateway processor 608 may parse the transaction data signal to obtain the transaction data superimposed thereon and may format the transaction data as necessary. The formatting of the transaction data may be performed by the gateway processor 608 based on the proprietary standards of the gateway processor 608 or an acquiring financial institution 610 associated with the payment transaction. The proprietary standards may specify the type of data included in the transaction data and the format for storage and transmission of the data. The acquiring financial institution 610 may be identified by the gateway processor 608 using the transaction data, such as by parsing the transaction data (e.g., deconstructing into data elements) to obtain an account identifier included therein associated with the acquiring financial institution 610. In some instances, the gateway processor 608 may then format the transaction data based on the identified acquiring financial institution 610, such as to comply with standards of formatting specified by the acquiring financial institution 610. In some embodiments, the identified acquiring financial institution 610 may be associated with the merchant 606 involved in the payment transaction, and, in some cases, may manage a transaction account associated with the merchant 606.

In step 630, the gateway processor 608 may electronically transmit a data signal superimposed with the formatted transaction data to the identified acquiring financial institution 610. The acquiring financial institution 610 may receive the data signal and parse the signal to obtain the formatted transaction data superimposed thereon. In step 632, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 606 involved in the payment transaction is requesting payment or a promise of payment from the issuing financial institution 602 for the transaction. The authorization request may include a plurality of data elements, each data element being configured to store data as set forth in the associated standards, such as for storing an account number, application cryptogram, transaction amount, issuing financial institution 602 information, etc.

In step 634, the acquiring financial institution 610 may electronically transmit the authorization request to a transaction processing server 612 for processing. The transaction processing server 612 may be comprised of one or more computing devices as part of a payment network configured to process payment transactions. In some embodiments, the authorization request may be transmitted by a transaction processor at the acquiring financial institution 610 or other entity associated with the acquiring financial institution. The transaction processor may be one or more computing devices that include a plurality of communication channels for communication with the transaction processing server 612 for the transmission of transaction messages and other data to and from the transaction processing server 612. In some embodiments, the payment network associated with the transaction processing server 612 may own or operate each transaction processor such that the payment network may maintain control over the communication of transaction messages to and from the transaction processing server 612 for network and informational security.

In step 636, the transaction processing server 612 may perform value-added services for the payment transaction. Value-added services may be services specified by the issuing financial institution 602 that may provide additional value to the issuing financial institution 602 or the consumer 604 in the processing of payment transactions. Value-added services may include, for example, fraud scoring, transaction or account controls, account number mapping, offer redemption, loyalty processing, etc. For instance, when the transaction processing server 612 receives the transaction, a fraud score for the transaction may be calculated based on the data included therein and one or more fraud scoring algorithms and/or engines. In some instances, the transaction processing server 612 may first identify the issuing financial institution 602 associated with the transaction, and then identify any services indicated by the issuing financial institution 602 to be performed. The issuing financial institution 602 may be identified, for example, by data included in a specific data element included in the authorization request, such as an issuer identification number. In another example, the issuing financial institution 602 may be identified by the primary account number stored in the authorization request, such as by using a portion of the primary account number (e.g., a bank identification number) for identification.

In step 638, the transaction processing server 612 may electronically transmit the authorization request to the issuing financial institution 602. In some instances, the authorization request may be modified, or additional data included in or transmitted accompanying the authorization request as a result of the performance of value-added services by the transaction processing server 612. In some embodiments, the authorization request may be transmitted to a transaction processor (e.g., owned or operated by the transaction processing server 612) situated at the issuing financial institution 602 or an entity associated thereof, which may forward the authorization request to the issuing financial institution 602.

In step 640, the issuing financial institution 602 may authorize the transaction account for payment of the payment transaction. The authorization may be based on an available credit amount for the transaction account and the transaction amount for the payment transaction, fraud scores provided by the transaction processing server 612, and other considerations that will be apparent to persons having skill in the relevant art. The issuing financial institution 602 may modify the authorization request to include a response code indicating approval (e.g., or denial if the transaction is to be denied) of the payment transaction. The issuing financial institution 602 may also modify a message type indicator for the transaction message to indicate that the transaction message is changed to be an authorization response. In step 642, the issuing financial institution 602 may transmit (e.g., via a transaction processor) the authorization response to the transaction processing server 612.

In step 644, the transaction processing server 612 may forward the authorization response to the acquiring financial institution 610 (e.g., via a transaction processor). In step 646, the acquiring financial institution may generate a response message indicating approval or denial of the payment transaction as indicated in the response code of the authorization response, and may transmit the response message to the gateway processor 608 using the standards and protocols set forth by the gateway processor 608. In step 648, the gateway processor 608 may forward the response message to the merchant 606 using the appropriate standards and protocols. In step 660, assuming the transaction was approved, the merchant 606 may then provide the products purchased by the consumer 604 as part of the payment transaction to the consumer 604.

In some embodiments, once the process 600 has completed, payment from the issuing financial institution 602 to the acquiring financial institution 610 may be performed. In some instances, the payment may be made immediately or within one business day. In other instances, the payment may be made after a period of time, and in response to the submission of a clearing request from the acquiring financial institution 610 to the issuing financial institution 602 via the transaction processing server 612. In such instances, clearing requests for multiple payment transactions may be aggregated into a single clearing request, which may be used by the transaction processing server 612 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 640), the transaction processing server 612 may be configured to perform authorization of transactions on behalf of the issuing financial institution 602. Such actions may be referred to as "stand-in processing," where the transaction processing server "stands in" as the issuing financial institution 602. In such instances, the transaction processing server 612 may utilize rules set forth by the issuing financial institution 602 to determine approval or denial of the payment transaction, and may modify the transaction message accordingly prior to forwarding to the acquiring financial institution 610 in step 644. The transaction processing server 612 may retain data associated with transactions for which the transaction processing server 612 stands in, and may transmit the retained data to the issuing financial institution 602 once communication is reestablished. The issuing financial institution 602 may then process transaction accounts accordingly to accommodate for the time of lost communication.

In another example, if the transaction processing server 612 is unavailable for submission of the authorization request by the acquiring financial institution 610, then the transaction processor at the acquiring financial institution 610 may be configured to perform the processing of the transaction processing server 612 and the issuing financial institution 602. The transaction processor may include rules and data suitable for use in making a determination of approval or denial of the payment transaction based on the data included therein. For instance, the issuing financial institution 602 and/or transaction processing server 612 may set limits on transaction type, transaction amount, etc. that may be stored in the transaction processor and used to determine approval or denial of a payment transaction based thereon. In such instances, the acquiring financial institution 610 may receive an authorization response for the payment transaction even if the transaction processing server 612 is unavailable, ensuring that transactions are processed and no downtime is experienced even in instances where communication is unavailable. In such cases, the transaction processor may store transaction details for the payment transactions, which may be transmitted to the transaction processing server 612 (e.g., and from there to the associated issuing financial institutions 602) once communication is reestablished.

In some embodiments, transaction processors may be configured to include a plurality of different communication channels, which may utilize multiple communication cards and/or devices, to communicate with the transaction processing server 612 for the sending and receiving of transaction messages. For example, a transaction processor may be comprised of multiple computing devices, each having multiple communication ports that are connected to the transaction processing server 612. In such embodiments, the transaction processor may cycle through the communication channels when transmitting transaction messages to the transaction processing server 612, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 610 may identify that an authorization request involves an issuing financial institution 602 (e.g., via the bank identification number included in the transaction message) for which no value-added services are required. The transaction processor at the acquiring financial institution 610 may then transmit the authorization request directly to the transaction processor at the issuing financial institution 602 (e.g., without the authorization request passing through the transaction processing server 612), where the issuing financial institution 602 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 612 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 608, acquiring financial institution 610, etc.) for processing using this advanced network, and to quickly and efficiently receive a response regarding the ability for a consumer 604 to fund the payment transaction.

Computer System Architecture

Figure 7:
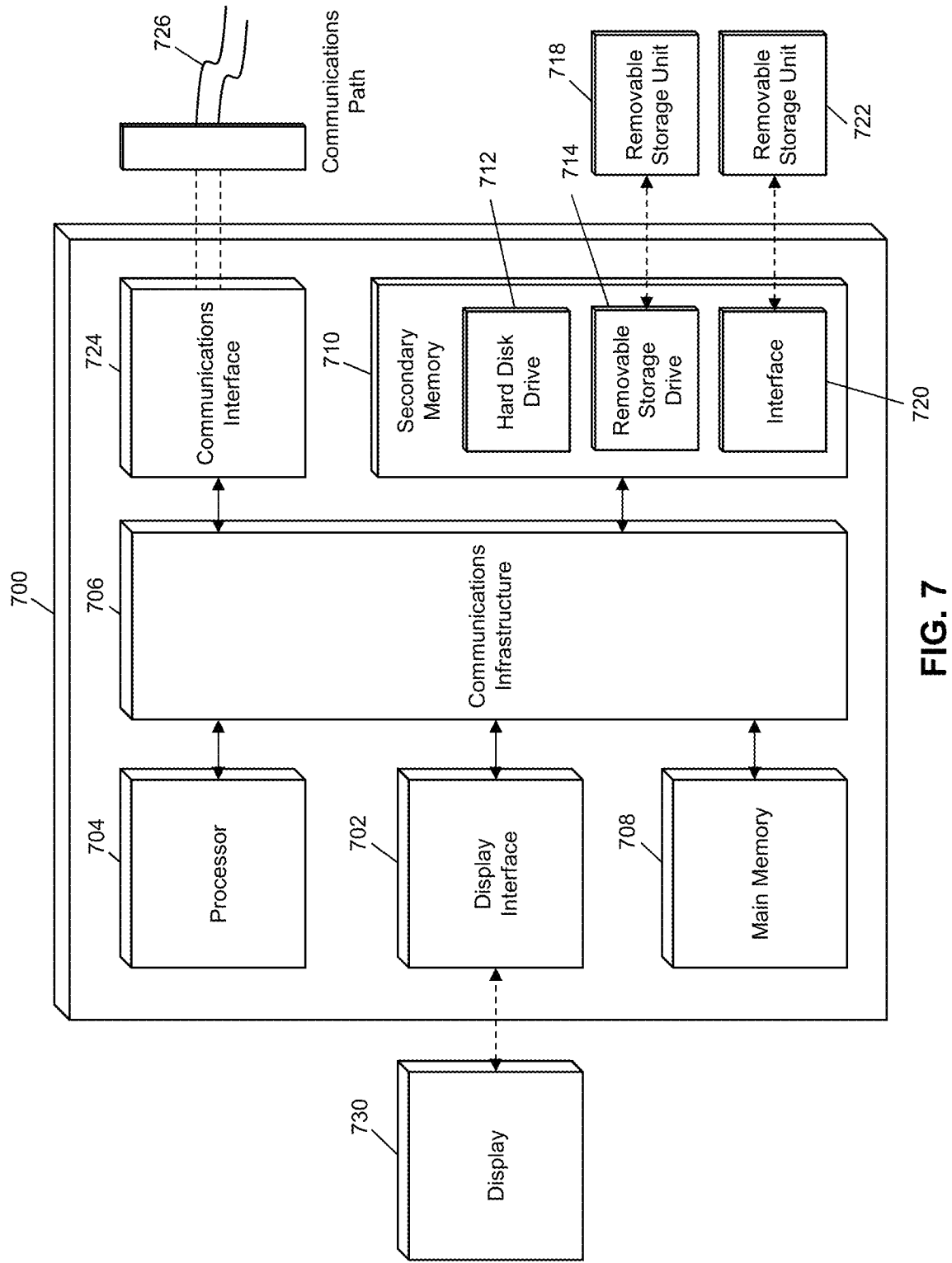
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, and 4-6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3A, 3B, and 4-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for generating cryptographic promissory notes for posting to a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for generating a cryptographic promissory note for posting to a blockchain, comprising:
    receiving, by a receiving device of a processing server, an authorization request for a payment transaction, wherein the authorization request is a transaction message formatted based on one or more standards and includes at least a plurality of data elements including at least a first data element configured to store a blockchain address associated with an acquirer and a second data element configured to store a transaction amount;
    generating, by a generation module of the processing server, a promissory note used in net settlement performed for payment transactions conducted during a predetermined period of time, wherein the promissory note comprises the transaction amount and at least one other piece of transaction data parsed from the received authorization request;
    digitally signing, by a signing module of the processing server, the generated promissory note with a private key;
    encrypting, by an encryption module of the processing server, the signed promissory note with a symmetric key;
    wrapping, by the encryption module of the processing server, the symmetric key with (1) a first public key corresponding to the private key to create a first wrapped symmetric key, and with (2) a second public key corresponding to a further private key associated with the acquirer involved in the payment transaction to create a second wrapped symmetric key;
    electronically transmitting, by a transmitting device of the processing server, a blockchain transaction to a blockchain network, wherein the blockchain transaction includes at least the encrypted promissory note, the first wrapped symmetric key, the second wrapped symmetric key, and the blockchain address; and
    recording the blockchain transaction in a block that is verified and added to the blockchain.

2. The method of claim 1, wherein the second public key associated with the acquirer is stored in a third data element included in the received authorization request.

3. The method of claim 1, wherein the symmetric key is additionally wrapped with a third public key to create a third wrapped symmetric key associated with a payment network.

4. The method of claim 3, wherein the authorization request is received from the payment network, and the electronically transmitted blockchain transaction includes the third wrapped symmetric key.

5. The method of claim 3, wherein the third public key associated with the payment network is stored in a third data element included in the received authorization request.

6. The method of claim 1, further comprising:
    receiving, by the receiving device, a transaction identifier associated with the blockchain transaction from the blockchain network;
    generating, by the generation module of the processing server, an authorization response for the payment transaction, wherein the authorization response is a transaction message formatted based on the one or more standards and includes the plurality of data elements further including a third data element configured to store the transaction identifier; and
    electronically transmitting, by the transmitting device of the processing server, the generated authorization response.

7. The method of claim 6, wherein
    the authorization request is received from a payment network, and
    the generated authorization response is electronically transmitted to the payment network.

8. The method of claim 1, wherein the private key is stored in a memory of the processing server.

9. The method of claim 1, wherein the symmetric key is unique to the generated promissory note.

10. The method of claim 1, further comprising:
    generating, by the generation module of the processing server, a valuation script based on at least the generated promissory note configured to determine a value of the generated promissory note, wherein
    the blockchain transaction further includes the generated valuation script.

11. The method of claim 1, further comprising:
    electronically transmitting, by the transmitting device of the processing server, a release instruction related to the payment transaction to a third party entity, wherein the release instruction is configured to instruct the third party entity to release the encrypted promissory note and each wrapped symmetric key to the acquirer involved in the payment transaction.

12. The method of claim 11, wherein the third party entity is at least part of the blockchain network.

13. The method of claim 1, further comprising:
    repeating, by the processing server, the receiving, generating, signing, encrypting, wrapping, and transmitting steps for a second payment transaction; and
    electronically transmitting, by the transmitting device of the processing server, a release instruction to a third party entity, wherein the release instruction indicates one of: the payment transaction or the second payment transaction, and is configured to instruct the third party entity to release the respective corresponding encrypted promissory note and the second wrapped symmetric key to the acquirer involved in the payment transaction.

14. A system for generating a cryptographic promissory note for posting to a blockchain, comprising:

a receiving device of a processing server configured to receive an authorization request for a payment transaction, wherein the authorization request is a transaction message formatted based on one or more standards and includes at least a plurality of data elements including at least a first data element configured to store a blockchain address associated with an acquirer and a second data element configured to store a transaction amount;

a generation module of the processing server configured to generate a promissory note used in net settlement performed for payment transactions conducted during a predetermined period of time, wherein the promissory note comprises the transaction amount and at least one other piece of transaction data parsed from the received authorization request;

a signing module of the processing server configured to digitally sign the generated promissory note with a private key;

an encryption module of the processing server configured to
encrypt the signed promissory note with a symmetric key, and
wrap the symmetric key with (1) a first public key corresponding to the private key to create a first wrapped symmetric key, and with (2) a second public key corresponding to a further private key associated with the acquirer involved in the payment transaction to create a second wrapped symmetric key; and a transmitting device of the processing server configured to electronically transmit a blockchain transaction to a blockchain network, wherein the blockchain transaction includes at least the encrypted promissory note, the first wrapped symmetric key, the second wrapped symmetric key, and the blockchain address, and wherein the blockchain transaction is included in a block that is verified and added to the blockchain.

15. The system of claim 14, wherein the second public key associated with the acquirer is stored in a third data element included in the received authorization request.

16. The system of claim 14, wherein the symmetric key is additionally wrapped with a third public key to create a third wrapped symmetric key associated with a payment network.

17. The system of claim 16, wherein the authorization request is received from the payment network, and the electronically transmitted blockchain transaction includes the third wrapped symmetric key.

18. The system of claim 16, wherein the third public key associated with the payment network is stored in a third data element included in the received authorization request.

19. The system of claim 14, wherein
the receiving device is further configured to receive a transaction identifier associated with the blockchain transaction from the blockchain network,
the generation module of the processing server is further configured to generate an authorization response for the payment transaction, wherein the authorization response is a transaction message formatted based on the one or more standards and includes the plurality of data elements further including a third data element configured to store the transaction identifier, and
the transmitting device of the processing server is further configured to electronically transmit the generated authorization response.

20. The system of claim 19, wherein
the authorization request is received from a payment network, and
the generated authorization response is electronically transmitted to the payment network.

21. The system of claim 14, wherein the private key is stored in a memory of the processing server.

22. The system of claim 14, wherein the symmetric key is unique to the generated promissory note.

23. The system of claim 14, wherein
the generation module of the processing server is further configured to generate a valuation script based on at least the generated promissory note configured to determine a value of the generated promissory note, and
the blockchain transaction further includes the generated valuation script.

24. The system of claim 14, wherein the transmitting device of the processing server is further configured to electronically a release instruction related to the payment transaction to a third party entity, wherein the release instruction is configured to instruct the third party entity to release the encrypted promissory note and each wrapped symmetric key to the acquirer involved in the payment transaction.

25. The system of claim 24, wherein the third party entity is at least part of the blockchain network.

26. The system of claim 14, wherein
the processing server is configured to repeat the receiving, generating, signing, encrypting, wrapping, and transmitting steps for a second payment transaction, and
the transmitting device of the processing server is further configured to electronically transmit a release instruction to a third party entity, wherein the release instruction indicates one of: the payment transaction or the second payment transaction and is configured to instruct the third party entity to release the respective corresponding encrypted promissory note and the second wrapped symmetric key to the acquirer involved in the payment transaction.

* * * * *